United States Patent
Mikuriya et al.

(10) Patent No.: US 9,830,531 B2
(45) Date of Patent: Nov. 28, 2017

(54) IMAGE PROCESSING APPARATUS, IMAGE PROCESSING METHOD AND NON-TRANSITORY COMPUTER READABLE MEDIUM STORING IMAGE PROCESSING PROGRAM

(71) Applicant: FUJI XEROX CO., LTD., Tokyo (JP)

(72) Inventors: Hiroshi Mikuriya, Yokohama (JP); Taro Mori, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/237,062

(22) Filed: Aug. 15, 2016

(65) Prior Publication Data

US 2017/0277971 A1 Sep. 28, 2017

(30) Foreign Application Priority Data

Mar. 23, 2016 (JP) ................................. 2016-057781

(51) Int. Cl.
*G06K 9/62* (2006.01)
*G06T 7/00* (2017.01)
*G06K 9/46* (2006.01)

(52) U.S. Cl.
CPC ......... *G06K 9/6202* (2013.01); *G06K 9/4604* (2013.01); *G06K 9/6215* (2013.01); *G06T 7/0081* (2013.01)

(58) Field of Classification Search
CPC ... G06K 9/6202; G06K 9/4604; G06K 9/6215
See application file for complete search history.

(56) References Cited

U.S. PATENT DOCUMENTS

2008/0069450 A1* 3/2008 Minami ............ G06K 9/00449
382/199
2017/0109600 A1* 4/2017 Voloshynovskiy G06K 9/00577

FOREIGN PATENT DOCUMENTS

JP 2000-251075 A 9/2000

\* cited by examiner

*Primary Examiner* — Phuoc Tran
(74) *Attorney, Agent, or Firm* — Oliff PLC

(57) ABSTRACT

An image processing apparatus includes: a splitting unit that splits each of two images into a plurality of regions; an extracting unit that extracts a first value indicating the highest similarity in an array, in the array values indicating similarity between corresponding split images between the two images are arranged, and that extracts a second value indicating highest similarity after excluding similarity in an area including a position of the first value from targets; and a controlling unit that controls to perform position alignment of the two images by excluding a value, of the values indicating the similarity of each of the split images, indicating similarity, a difference between the first value and the second value is less than or equal to a predetermined threshold in the similarity.

4 Claims, 11 Drawing Sheets

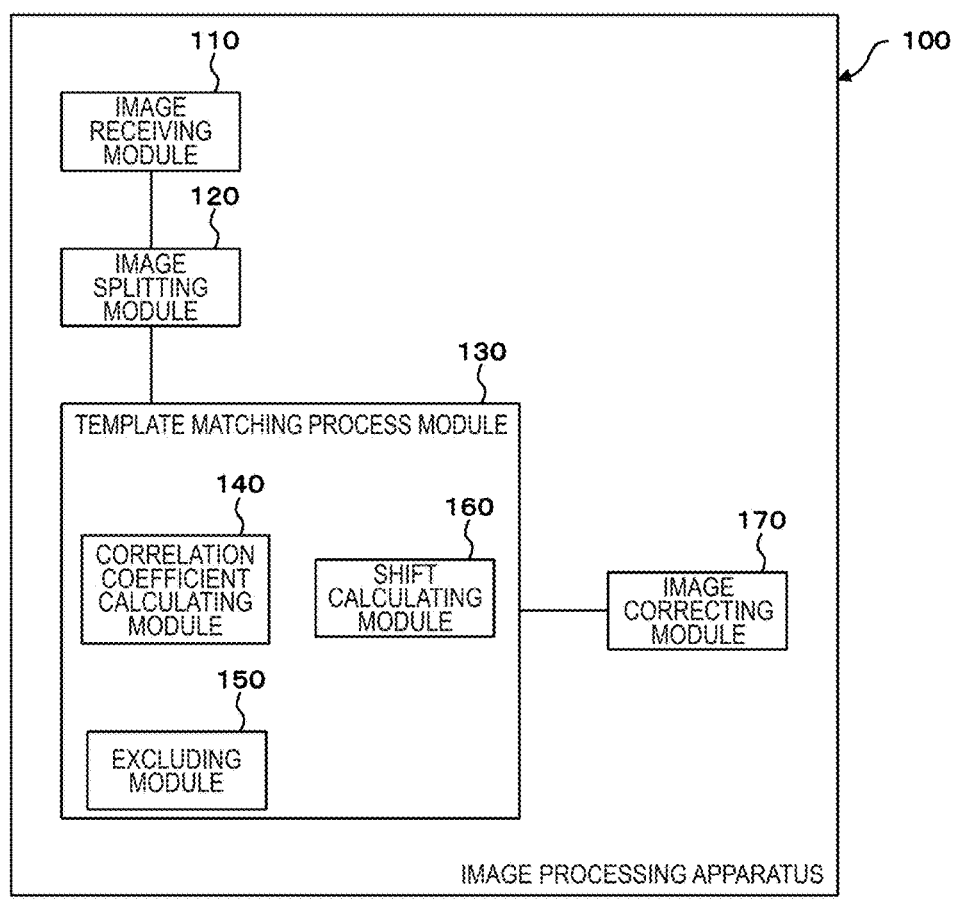

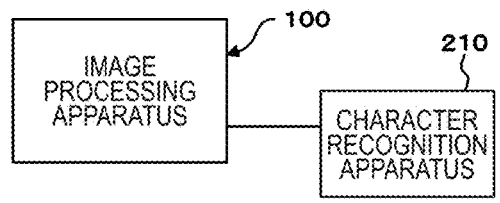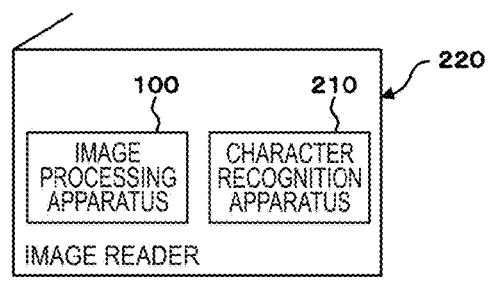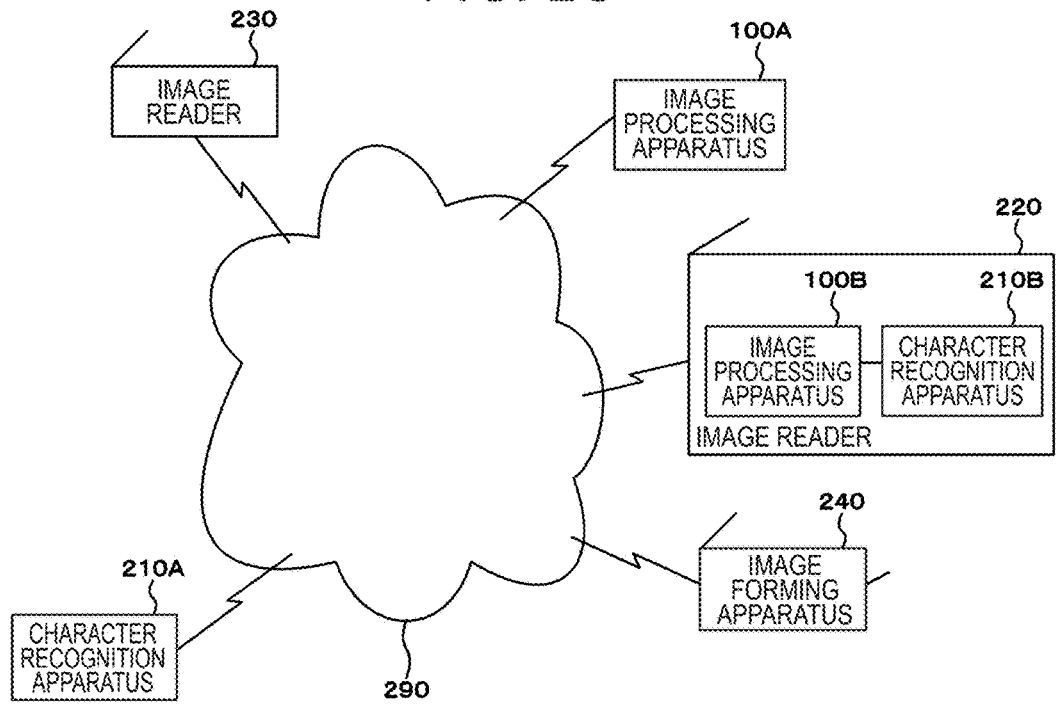

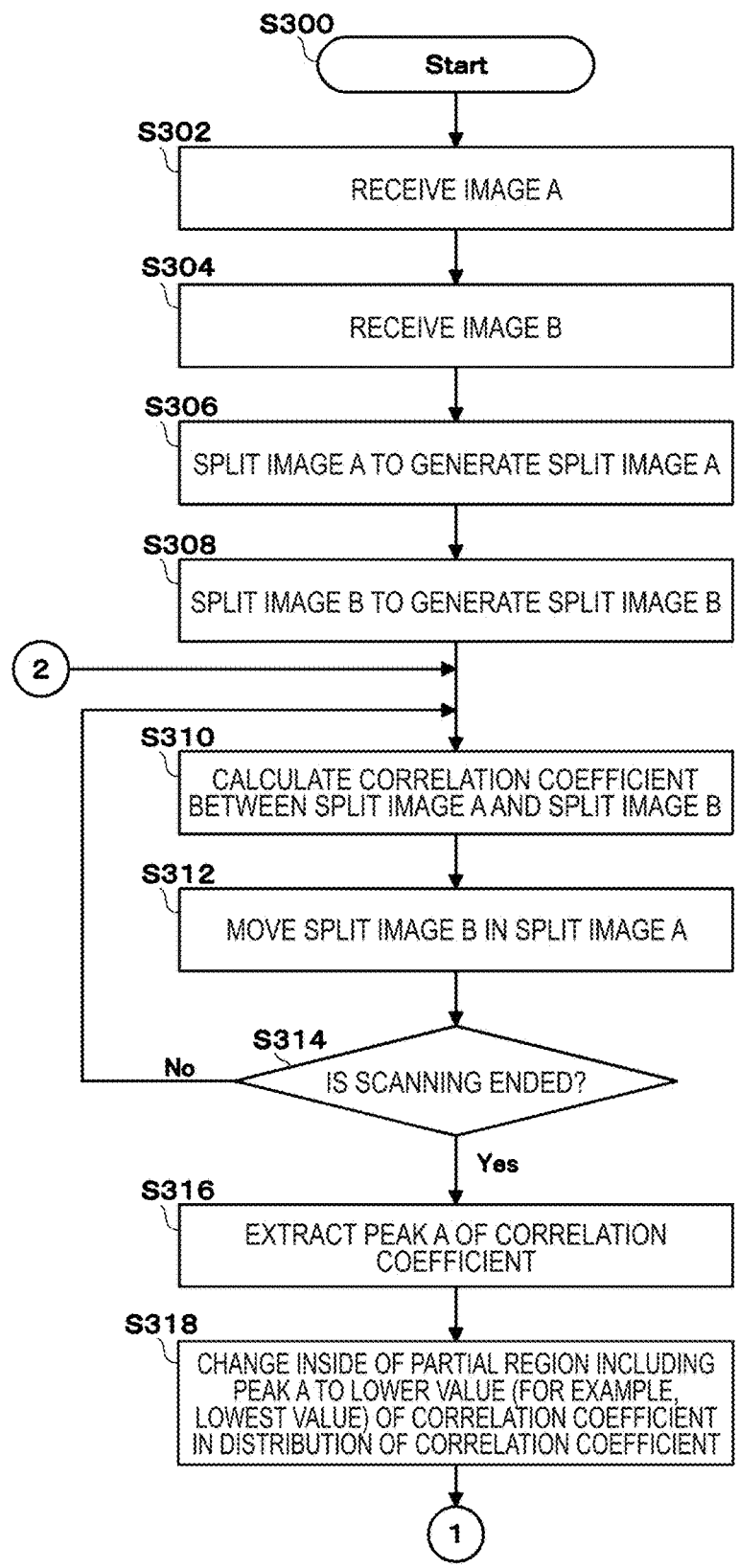

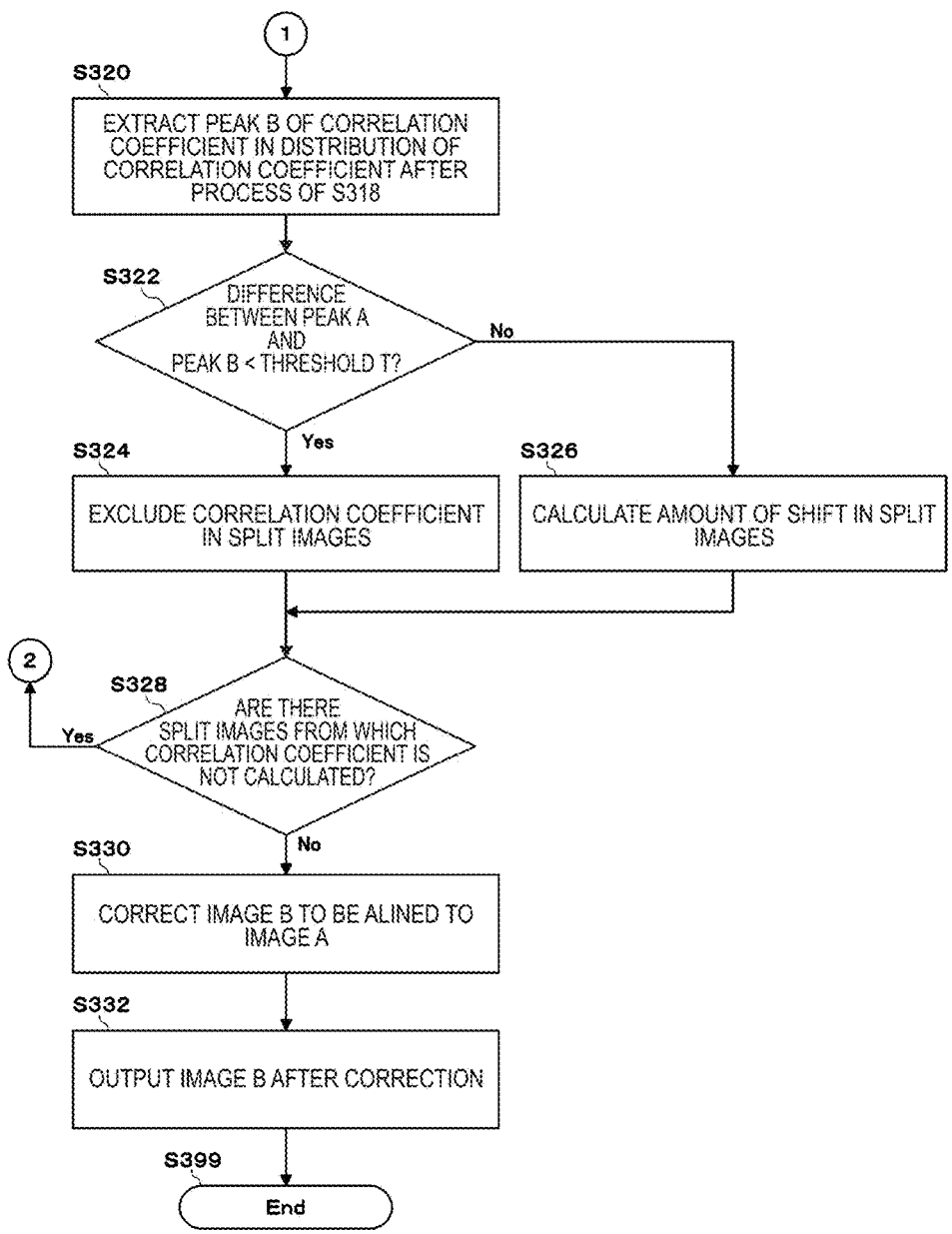

FIG. 9A1
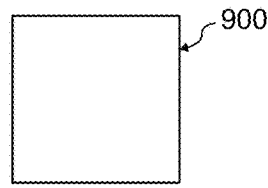
FIG. 9A2
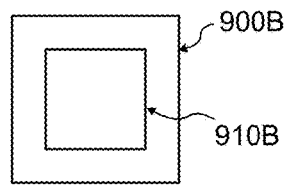
FIG. 9B1
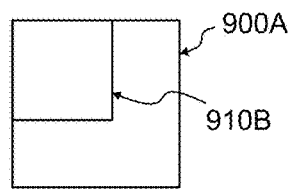
FIG. 9B2
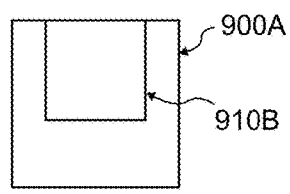
FIG. 9B3
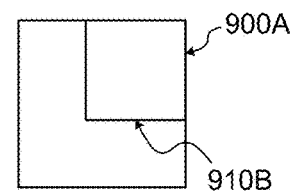
FIG. 9B4
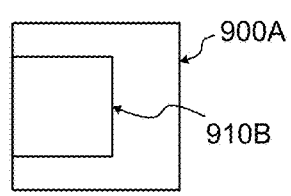
FIG. 9B5
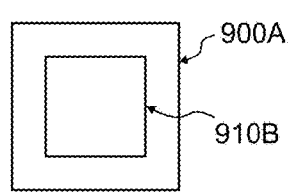
FIG. 9B6
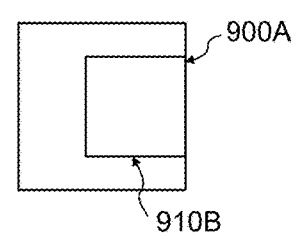
FIG. 9B7
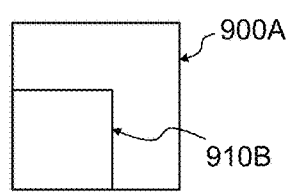
FIG. 9B8
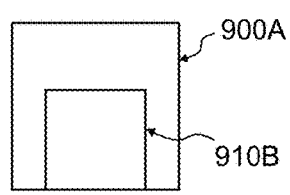
FIG. 9B9
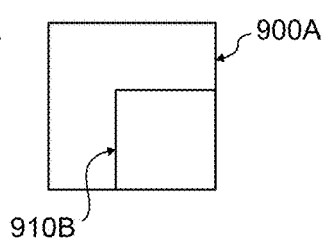
FIG. 9C
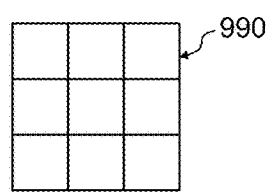

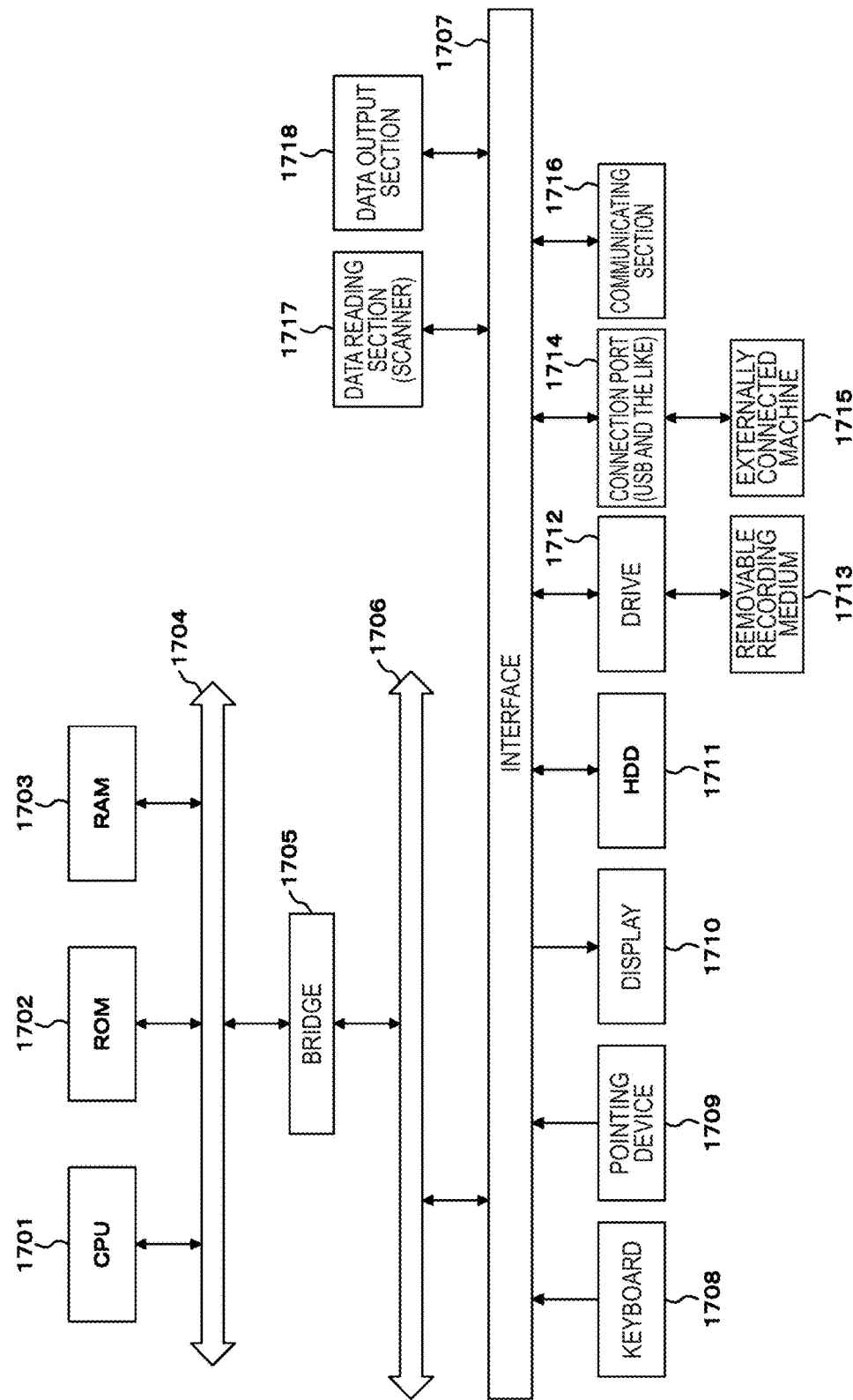

ically or logically. Accordingly, "system" is used as a synonym of "apparatus". Needless to say, the "system" does not include what is not more than a social "mechanism" (social system) that is an artificial agreement.

IMAGE PROCESSING APPARATUS, IMAGE PROCESSING METHOD AND NON-TRANSITORY COMPUTER READABLE MEDIUM STORING IMAGE PROCESSING PROGRAM

CROSS-REFERENCE TO RELATED APPLICATIONS

This application is based on and claims priority under 35 USC 119 from Japanese Patent Application No. 2016-057781 filed Mar. 23, 2016.

BACKGROUND

The present invention relates to an image processing apparatus, an image processing method and a non-transitory computer readable medium storing an image processing program.

SUMMARY

According to an aspect of the invention, there is provided an image processing apparatus comprising: a splitting unit that splits each of two images into a plurality of regions; an extracting unit that extracts a first value indicating the highest similarity in an array, in the array values indicating similarity between corresponding split images between the two images are arranged, and that extracts a second value indicating highest similarity after excluding similarity in an area including a position of the first value from targets; and a controlling unit that controls to perform position alignment of the two images by excluding a value, of the values indicating the similarity of each of the split images, indicating similarity, a difference between the first value and the second value is less than or equal to a predetermined threshold in the similarity.

BRIEF DESCRIPTION OF THE DRAWINGS

Exemplary embodiments of the present invention will be described in detail based on the following figures, wherein:

FIG. 1 is a conceptual module configuration diagram for a configuration example of a present exemplary embodiment;

FIGS. 2A to 2C are descriptive diagrams illustrating a system configuration example that uses the present exemplary embodiment;

FIG. 3 is a flowchart illustrating a process example of the present exemplary embodiment;

FIG. 4 is a flowchart illustrating a process example of the present exemplary embodiment;

FIG. 5 is a descriptive diagram illustrating an example of one image of the present exemplary embodiment;

FIG. 6 is a descriptive diagram illustrating an example of the other image of the present exemplary embodiment;

FIGS. 9A1 to 9C are descriptive diagrams illustrating a process example of the present exemplary embodiment;

FIG. 17 is a block diagram illustrating a hardware configuration example of a computer that realizes the present exemplary embodiment.

DETAILED DESCRIPTION

Figure 7:
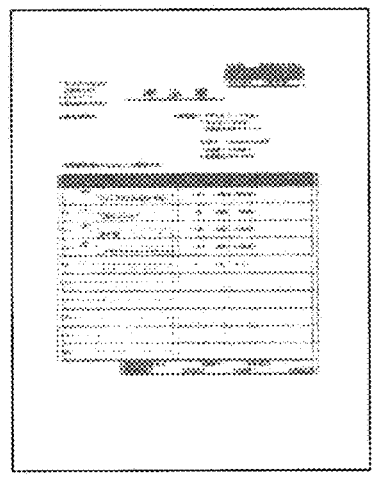
FIG. 7 is a descriptive diagram illustrating an example of a case where two images are simply superimposed.

Hereinafter, an example of one exemplary embodiment for realizing the present invention will be described on the basis of the drawings.

FIG. 1 illustrates a conceptual module configuration diagram for a configuration example of the present exemplary embodiment.

A module generally refers to a logically separable component of software (computer program), hardware, and the like. Therefore, a module in the present exemplary embodiment refers to not only a module in a computer program but also a module in a hardware configuration. Accordingly, the present exemplary embodiment describes a computer program that provides functionality as modules (a program that causes a computer to execute individual procedures, a program that causes a computer to function as individual units, or a program that causes a computer to realize individual functions) and a system and a method as well. While the terms "store" and "stored" and the equivalents thereof are used for convenience of description, these terms mean storing in a storage device or controlling to store in a storage device in a case where the exemplary embodiment is a computer program. Modules may correspond one-to-one to functions. In implementation, one module may be configured of one program, multiple modules may be configured of one program, or conversely one module may be configured of multiple programs. Multiple modules may be executed by one computer. One module may be executed by multiple computers that are computers in a distributed or parallel environment. One module may include another module. Hereinafter, the term "connection" will be used in a case of logical connection (data exchange, instructions, reference relationships among data, and the like) in addition to physical connection. The term "predetermined" will refer to being determined before a target process and is used to include the meaning of being determined in accordance with the status or the state at or until the point in time before not only the start of processes of the present exemplary embodiment but also before a target process even if processes of the present exemplary embodiment are started. A "predetermined value", if existing in multiple numbers, may be a different value from each other, or two or more values (apparently includes all values) may be the same. A description having the meaning of "B is performed in a case where A is true" will be used to mean "a determination as to whether or not A is true is performed and B is performed in a case where A is determined to be true". Exceptions are made in a case where a determination as to whether or not A is true is not required.

A system or an apparatus is not only configured by connecting multiple computers, hardware, devices, and the like with a communication unit such as a network (includes one-to-one communication connection) but also is realized by one computer, hardware, device, or the like. The terms "apparatus" and "system" will be used as terms having the same definition. Apparently, "system" does not include a system that is limited to a social "structure" (social system) which is artificial agreement.

Information of a target will be read from a storage device in each process performed by each module or in each process in a case where multiple processes are performed in a module, and the process result will be written to the storage device after the process is performed. Therefore, reading from the storage device before the process and writing to the storage device after the process may not be described. The storage device referred hereto may include a hard disk, a random access memory (RAM), an external storage medium, a storage device connected through a communication line, a register in a central processing unit (CPU), and the like.

An image processing apparatus 100 that is the present exemplary embodiment aligns the positions of two images and, as illustrated in the example of FIG. 1, includes an image receiving module 110, an image splitting module 120, a template matching process module 130, and an image correcting module 170.

The image receiving module 110 is connected to the image splitting module 120. The image receiving module 110 receives multiple images and passes the images to the image splitting module 120. Receiving images includes, for example, reading images with a scanner, a camera, and the like, receiving images with a facsimile and the like from an external machine through a communication line, and reading images that are stored in a hard disk (includes a network-connected hard disk and the like in addition to a hard disk incorporated in a computer) and the like. The images may be binary images or multivalued images (includes color images). The received images are in multiple numbers. The content of the images may be a document used for business, an advertising pamphlet, and the like.

Figure 5:
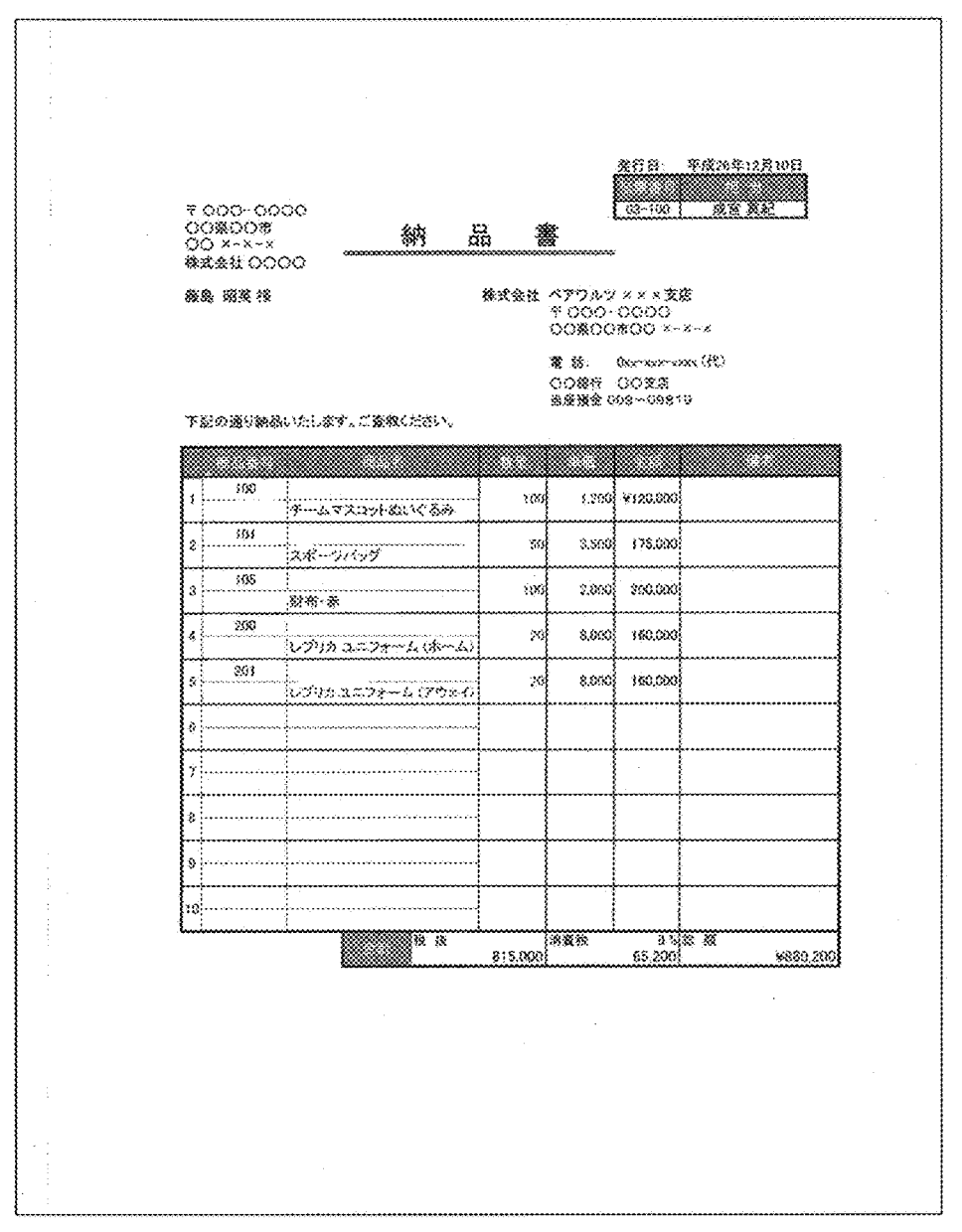
Figure 6:
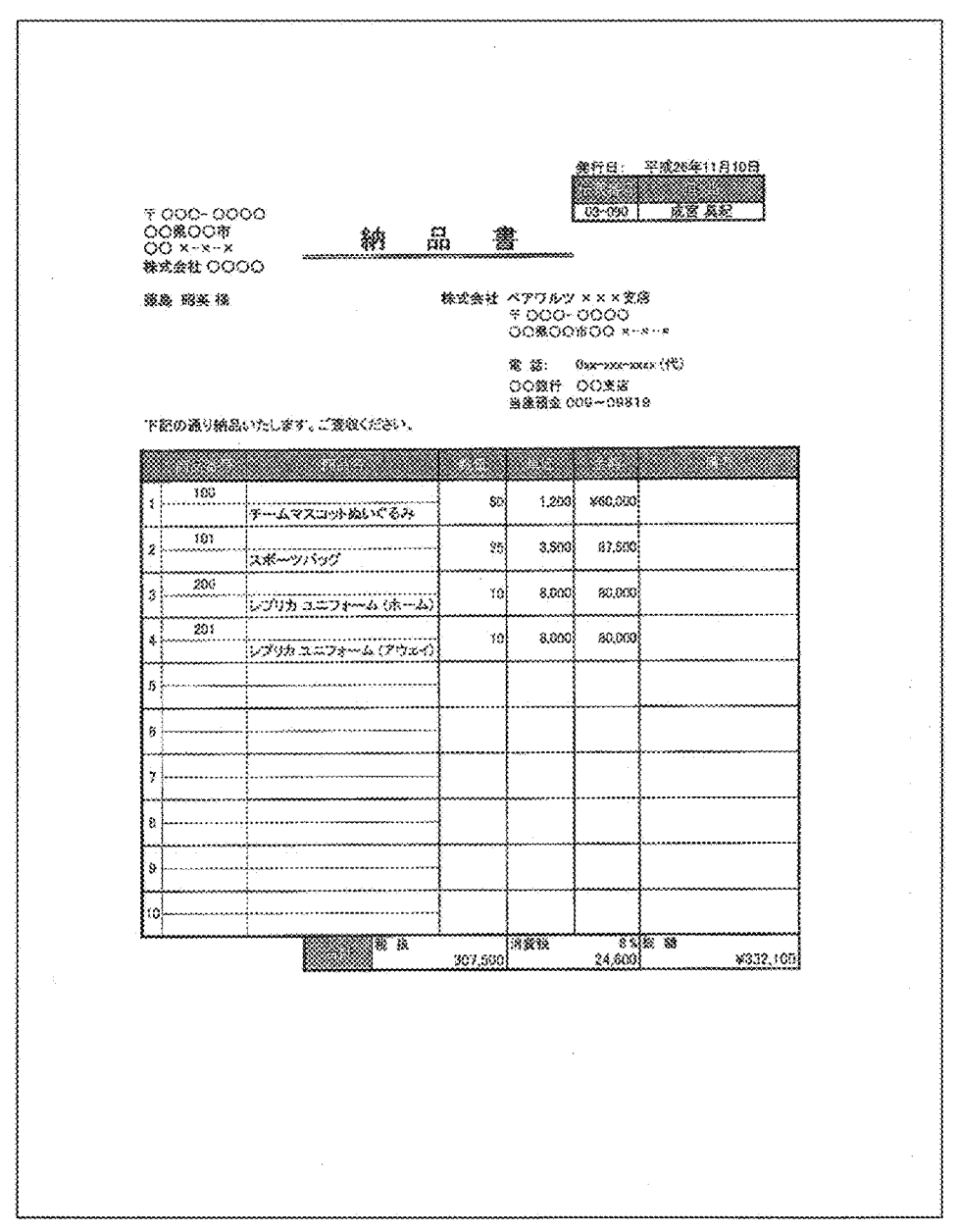

The multiple images received by the image receiving module 110 are images of position alignment targets. For example, the images are document images that use the same template (a format, a formula, a form, and the like). Position alignment is, for example, applying specification of a region performed on an image (generally the first image) by operation by an operator to other images (the second and subsequent images). For example, images illustrated in FIG. 5 and FIG. 6 are both documents described in a template referred to as "納品書", which is a Japanese word that means a statement of delivery, and have the same original template part (a table formed in a rectangular shape and the like), though having different contents (characters and the like described). Therefore, region specification performed on the image of FIG. 5 is originally supposed to be capable of being performed on the image of FIG. 6 with the coordinates unchanged.

However, positional deviation generally occurs according to the performance of the scanner and the like that read the images. An image illustrated in the example of FIG. 7 is obtained by simple superimposition of the image of FIG. 5 and the image of FIG. 6. It is understood that the ruled lines and the like of the table are shifted. Even if the images use the same template, a shift occurs between both. Therefore, position alignment (positional deviation correction) is required in order to apply region specification performed on one image to another image that uses the same template.

The image splitting module 120 is connected to the image receiving module 110 and the template matching process module 130. The image splitting module 120 splits each of the two images received by the image receiving module 110 into multiple regions.

The expression "split each of two images into multiple regions" specifically means that two images are split into the same number of regions in the vertical direction and the lateral direction to generate the same number of split images from the two images. A split image is an image of a rectangular shape (includes an oblong shape and a square shape).

A first split image of one image is set to be a smaller image than a second split image of the other image.

Figure 8A:
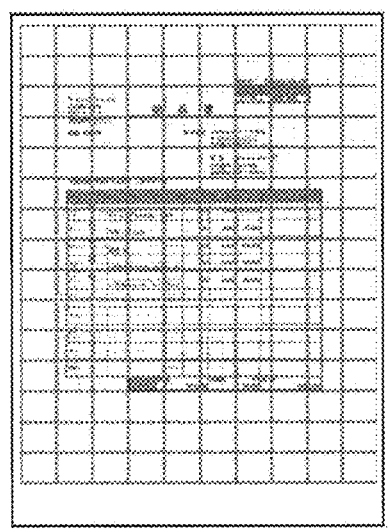
FIGS. 8A and 8B are descriptive diagrams illustrating a process example of the present exemplary embodiment.
Figure 8B:
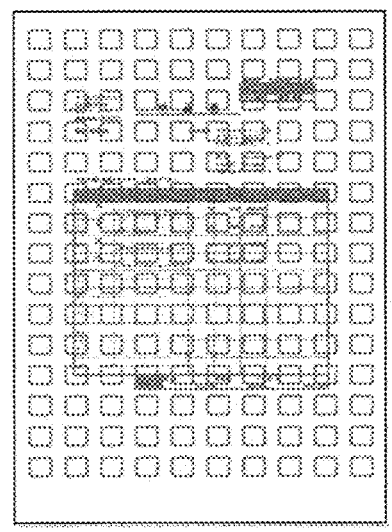

The image illustrated in FIG. 5 is split into regions in the example illustrated in FIG. 8A. The image illustrated in FIG. 6 is split into regions in the example illustrated in FIG. 8B. In these examples, both image are split into 10 regions in the lateral direction and 15 regions in the vertical direction. The split images illustrated in FIG. 8B are smaller than the split images illustrated in FIG. 8A. Specifically, the split images may be decreased by a predetermined number of pixels in the upward direction, the downward direction, the leftward direction, and the rightward direction. The number of pixels in each direction may be the same or may be different. For example, a decrease of 5 pixels in the upward and downward directions and a decrease of 10 pixels in the leftward and rightward directions may be made.

While all of the split images in one image have the same size in the examples of FIGS. 8A and 8B, the images may be split into split images of different sizes. In that case, the two images are required to have corresponding split images.

The template matching process module 130 includes a correlation coefficient calculating module 140, an excluding module 150, and a shift calculating module 160 and is connected to the image splitting module 120 and the image correcting module 170.

The correlation coefficient calculating module 140 calculates a value that indicates the similarity between corresponding split images, which are generated by the image splitting module 120, between the two images. The expression "corresponding split images between two images" refers to the split images in the same position in the two images. Specifically, a split image (A) in an upper left position of one image corresponds to a split image (a) in an upper left position of the other image. A split image (B) of one image in a position right adjacent to the split image (A) corresponds to a split image (b) of the other image in a position right adjacent to the split image (a). Hereinafter, similarly, all of the split images in one image will have corresponding split images in the other image. The value indicating similarity may be a value that indicates the similarity between images, and specific examples thereof include a correlation coefficient, the sum of absolute differences (SAD), the sum of squared differences (SSD), and the like. Hereinafter, the correlation coefficient will be illustratively described, though other values may apparently be used.

Calculation of the correlation coefficient may use an existing technology. For example, calculation may be performed by using Equation (1). That is, a correlation coefficient r is calculated by using Equation (1) from a data array $\{(x_i, y_i)\}$ (i=1, 2, . . . , n) that has sets of two pixel values. The reference sign $x_i$ is the pixel value of the first split image, and the reference $y_i$ is the pixel value of the second split image.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{Equation (1)}$$

where $\bar{x}$ and $\bar{y}$ are arithmetic averages of data x={$x_i$} and y={$y_i$}.

The correlation coefficient is calculated by shifting the first split image in the second split image. The first split image is smaller than the second split image. An array of correlation coefficients is generated in accordance with the positional relationship between the second split image and the first split image.

A split image A (900A) illustrated in the example of FIG. 9A1 illustrates one split image illustrated in FIG. 8A. A split image B (910B) illustrated in the example of FIG. 9A2 illustrates one split image illustrated in FIG. 8B. That is, the split image B (910B) is extracted from a region B (900B) of FIG. 8B that corresponds to the position of the split image A (900A) of FIG. 8A. There is one split image A (900A) as illustrated in FIG. 9A1, and there is another split image B (910B) illustrated in FIG. 9A2 in a corresponding position. The split image B (910B) is obtained by decreasing the region B (900B) (has the same size as the split image A (900A)). The split image A (900A) is set to have a rectangular shape of vertically five pixels and horizontally five pixels, and the split image B (910B) is set to have a rectangular shape of vertically three pixels and horizontally three pixels for simplification of description. While the image of a region that is decreased by one pixel in the upward, downward, leftward, and rightward directions from the region B (900B) is set as the split image B (910B) in this example, the upper side of the region may be decreased by V (V is an integer greater than or equal to one) pixels, the right side by W (W is an integer greater than or equal to one) pixels, the lower side by X (X is an integer greater than or equal to one) pixels, and the left side by Y (Y is an integer greater than or equal to one) pixels. The reference signs V, W, X, and Y may be different numerical values or may include the same numerical value, or all may be the same numerical value.

The expression "by shifting" means the same as scanning images and is specifically as follows. As illustrated in the examples of FIG. 9B1 to FIG. 9B9, the split image B (910B) is arranged in an upper left end position of the split image A (900A) (FIG. 9B1). The split image B (910B) is moved in the rightward direction one pixel (one pixel in this example; not required to be limited to one pixel) at a time from the position (FIG. 9B2). When the split image B (910B) reaches the right end (FIG. 9B3), the split image B (910B) is moved to the left end of a row one pixel below the previous row (FIG. 9B4). The split image B (910B) is moved to the lower right end (FIG. 9B9). The correlation coefficient is calculated in each position. Nine correlation coefficients are calculated in the examples of FIG. 9B1 to FIG. 9B9. These correlation coefficients are stored in a correlation coefficient array 990 that is a 3×3 array illustrated in the example of FIG. 9C. That is, the correlation coefficient in FIG. 9B1 is stored in the (1, 1) position of the correlation coefficient array 990. The correlation coefficient in FIG. 9B2 is stored in the (1, 2) position of the correlation coefficient array 990. The correlation coefficient in FIG. 9B3 is stored in the (1, 3) position of the correlation coefficient array 990. The correlation coefficient in FIG. 9B4 is stored in the (2, 1) position of the correlation coefficient array 990. The correlation coefficient in FIG. 9B5 is stored in the (2, 2) position of the correlation coefficient array 990. The correlation coefficient in FIG. 9B6 is stored in the (2, 3) position of the correlation coefficient array 990. The correlation coefficient in FIG. 9B7 is stored in the (3, 1) position of the correlation coefficient array 990. The correlation coefficient in FIG. 9B8 is stored in the (3, 2) position of the correlation coefficient array 990. The correlation coefficient in FIG. 9B9 is stored in the (3, 3) position of the correlation coefficient array 990. Therefore, the correlation coefficient array 990 illustrated in the example of FIG. 9C is an array that results from calculating the correlation coefficient by shifting the split image B (910B) in the split image A (900A).

Next, a first value that indicates the highest similarity is extracted from the array in which values indicating the similarity between corresponding split images between the two images are arranged, and a second value that indicates the highest similarity after the similarity in an area including the position of the first value is excluded from targets is extracted. The second value is preferably extracted from targets other than the vicinity of the first value. Methods for realizing the extraction include methods such as (1) the vicinity of the position of the first value is filled with values having low similarity (so-called negative scores) and (2) the second value is extracted by repeating extraction of the highest value excluding the vicinity of the position of the first value. Hereinafter, a process example of the excluding module 150 that adopts the method (1) will be described. Apparently, the method (2) and the like may be adopted as well.

The excluding module 150 converts, to a predetermined value, the values of the correlation coefficients in the area including the position of the first value (the value indicating the highest similarity in the array; a so-called peak value) which is the highest correlation coefficient in the array in which the correlation coefficients between the corresponding split images between the two images are arranged. A value that is less than or equal to the lowest value of the values of the correlation coefficients or a value that is less than or equal to the lowest value in the array may be used as the "predetermined value". That is, the values in the area are preferably not extracted as the second value. The expression "area including the position of the first value" means the so-called vicinity of the position of the first value. The area may be an area in a rectangular shape (an oblong shape including a square shape) of a predetermined size around the position of the first value, an area in a circle drawn at a predetermined radius around the position of the first value, and the like.

Next, the excluding module 150 extracts the second value (a so-called peak value in the array after filled with so-called negative scores) which is the highest correlation coefficient in the array after conversion.

The excluding module 150 controls position alignment to be performed of the two images by excluding the correlation coefficients, of the correlation coefficients of each split image, for which the difference between the first value and the second value is less than or equal to a predetermined threshold. That is, the correlation coefficients other than the excluded correlation coefficients are passed to the shift calculating module 160.

Figure 10A:
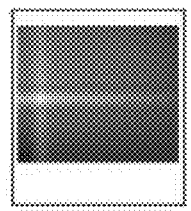
FIGS. 10A and 10B are descriptive diagrams illustrating a process example of the present exemplary embodiment.
Figure 10B:
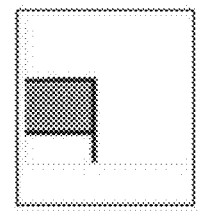
Figure 11A:
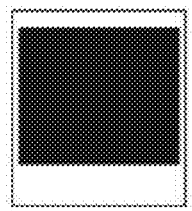
FIGS. 11A and 11B are descriptive diagrams illustrating a process example of the present exemplary embodiment.
Figure 11B:
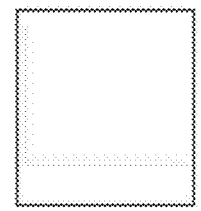
Figure 12A:
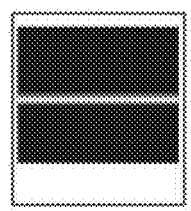
FIGS. 12A and 12B are descriptive diagrams illustrating a process example of the present exemplary embodiment.
Figure 12B:
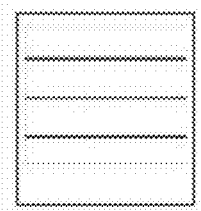

The examples of FIG. 10A to FIG. 12B illustrate the array of the correlation coefficients and the original split images in contrast. The examples illustrated in each of FIGS. 10B, 11B, and 12B illustrate one of the original split images. The examples illustrated in each of FIGS. 10A, 11A, and 12A illustrate the array of the correlation coefficients (between the corresponding split images in the two images) of the split image, in which a value of a high correlation coefficient close to "1" is illustrated in white and a value of a low correlation coefficient close to "4" is illustrated in black.

A position of a high correlation coefficient (white position) is illustrated as being positioned at the left side center in FIGS. 10A and 10B.

A position of a low correlation coefficient is illustrated as being positioned in the entire area in FIGS. 11A and 11B. The example illustrated in FIG. 11A is in black. Two reasons are described as follows.

One is a case of division by zero. When all pixels have the same value, the divisor in the calculation of correlation coefficients is equal to zero, and correlation coefficients are incalculable. Thus, FIG. 11A is illustrated in black. Since division is performed by zero, correlation coefficients are "incalculable" even if the values of all pixels match each other. The fact of being incalculable is not regarded as "high correlation". The fact of being "incalculable" is required to be matched to a real number for convenience of calculating the maximum value or outputting a state in the example of FIG. 11A. In this case, the fact of being incalculable is properly matched to "0 or −1" that indicates noncorrelation. The fact of being "incalculable" when set to one may be adopted as the maximum value.

Another reason is a case where fine roughness on the surface of paper is captured as an image. Paper is seen as exhibiting pure white by a naked eye but is not completely pure white in pixel values, and noise and the like are considered to exist. In this case, since the roughness on the surface of paper rarely has a high correlation with that of different paper, all places on the paper have values that are very close to zero, and appear in black in the example of FIG. 11A.

A position of a high correlation coefficient is illustrated as being positioned at the horizontal center in FIGS. 12A and 12B. That is, two split images are illustrated as matching each other even if shifted leftward or rightward.

Figure 13:
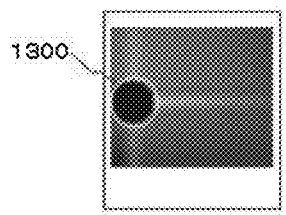
FIG. 13 is a descriptive diagram illustrating a process example of the present exemplary embodiment.
Figure 14:
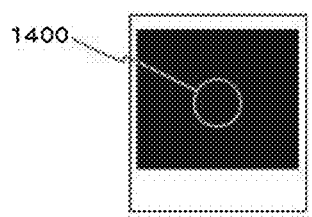
FIG. 14 is a descriptive diagram illustrating a process example of the present exemplary embodiment.
Figure 15:
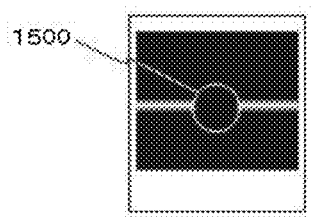
FIG. 15 is a descriptive diagram illustrating a process example of the present exemplary embodiment.

The examples of FIG. 13 to FIG. 15 illustrate the result of converting the values of the correlation coefficients in the area including the position of the first value, which is the highest correlation coefficient in the array, into a predetermined value. The correlation coefficient which is "the highest in the array" is not necessarily a value close to "1" provided that the correlation coefficient is the highest in the array. The area may be in any shape provided that the area includes the position of the first value. The size of the area is equal to a predetermined size. The area is preferably a circle around the position of the first value and has a radius equal to the predetermined size. The lowest value (−1) of the values of the correlation coefficients is used as the "predetermined value" for conversion.

The highest correlation coefficient in the array is positioned at the left side center in FIG. 13. Thus, an area 1300 is arranged in a position that includes the position of the highest correlation coefficient.

The highest correlation coefficient in the array is positioned at the center, for example, in FIG. 14. Thus, an area 1400 is arranged in a position that includes the position of the highest correlation coefficient.

The highest correlation coefficient in the array is illustrated as being positioned at the center in FIG. 15. Thus, an area 1500 is arranged in a position that includes the position of the highest correlation coefficient.

The insides of the area 1300, the area 1400, and the area 1500 are set to the lowest value (−1). The areas are filled in black in FIG. 13 to FIG. 15.

Next, the second value (peak value) is extracted in the arrays of FIG. 13 to FIG. 15. The second value is a value less than or equal to the first value.

The coordinates at which the correlation coefficient is at the peak thereof are excluded from a list of coordinates used for position alignment in a case where the difference between the first value and the second value is less than or equal to the predetermined threshold. The examples of FIG. 14 and FIG. 15 are excluded. Therefore, the example of FIG. 13 is used for position alignment. That is, split images in which the peak of the correlation coefficient is fixed at one point are adopted.

The reason why the target to be set to the lowest value is set to be an area having a range and not a point is that the correlation coefficients around the peak are highly likely to have values close to the peak.

Figure 16A:
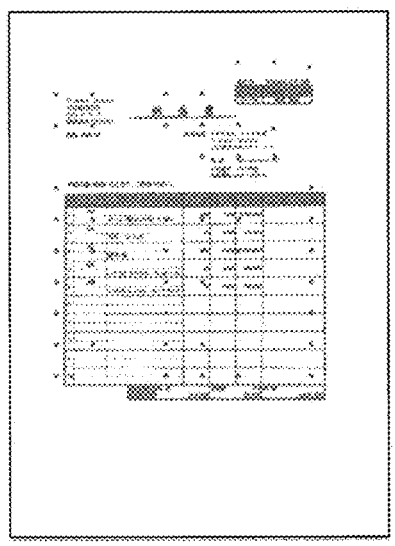
FIGS. 16A and 16B are descriptive diagrams illustrating a process example of the present exemplary embodiment.
Figure 16B:
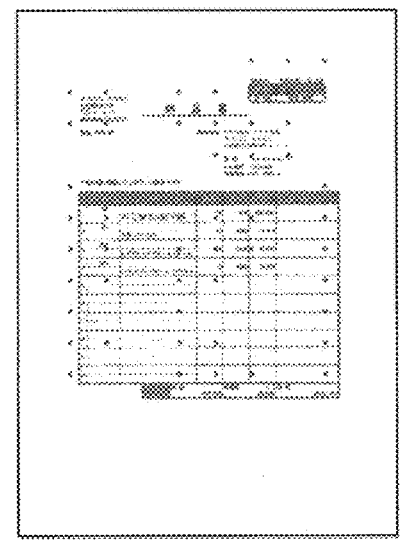

The central positions of split images used for shift calculation are illustrated by a dot (black point) in the examples illustrated in FIGS. 16A and 16B. The example illustrated in FIG. 16A is obtained by plotting the central positions of split images on the image illustrated in the example of FIG. 5, and the example illustrated in FIG. 16B is obtained by plotting the central positions of split images on the image illustrated in the example of FIG. 6. It is understood that split images including a background part or only horizontal lines (or only vertical lines) are excluded. Conversely, split images including characters, intersections of lines, and the like are adopted. The shift calculating module 160 uses the correlation coefficients of the split images positioned at the dots to calculate the shift between the two images.

The shift calculating module 160 uses the correlation coefficients other than the excluded correlation coefficients to calculate the shift between the two images. The shift calculating module 160 uses the correlation coefficients in the split images to which dots are attached to calculate the shift in the examples illustrated in FIGS. 16A and 16B. There is no shift if the position of the first value is the center in the array. The positional relationship between the position of the first value and the center in the array is the shift (the distance and the direction between two points).

The image correcting module 170 is connected to the template matching process module 130. The image correcting module 170 uses the shift calculated by the shift calculating module 160 to correct the images. Specifically, affine transformation (typically parallel movement) may be performed in the opposite direction by the distance corresponding to the shift. That is, affine transformation may be performed to position the first value at the center in the array.

FIGS. 2A to 2C are descriptive diagrams illustrating a system configuration example that uses the present exemplary embodiment.

A character recognition apparatus 210 is connected to the image processing apparatus 100 in the example illustrated in FIG. 2A. As described above, the image processing apparatus 100 reads multiple document images created by using a template and performs position alignment. A recognized region is set in one (generally the initial document image) of the document images by operation by the operator. The character recognition apparatus 210 recognizes characters in the recognized region. Since position alignment is performed, the operator is not required to set the recognized region in the other document images. When position alignment is not performed by the image processing apparatus 100, a shift occurs, and the recognized region is required to be set in all of the document images. Alternatively, the recognition rate is decreased due to a shift in a case where the recognized region that is set in one document image is used without change.

The example illustrated in FIG. 2B is a system configuration in which an image reader 220 includes the image processing apparatus 100 and the character recognition apparatus 210. The same process as that in the example illustrated in FIG. 2A can be performed on multiple document images read by the image reader 220.

The example illustrated in FIG. 2C is a system configuration in which an image processing apparatus 100A, a character recognition apparatus 210A, the image reader 220, an image reader 230, and an image forming apparatus 240 are connected to each other through a communication line 290. The communication line 290 may be a wireless type, a wired type, or a combination thereof and may be, for example, the Internet or an intranet as a communication infrastructure. Functions provided by the image processing apparatus 100 may be realized as cloud services.

Document images read by the image reader 230 and the image forming apparatus 240 that is a multifunction machine (an image processing apparatus that has two or more functions of a scanner, a printer, a photocopier, a facsimile, and the like) may be sent to the image processing apparatus 100A (or an image processing apparatus 100B in the image reader 220) through the communication line 290, images that are obtained after position alignment may be sent to the character recognition apparatus 210A (or a character recognition apparatus 210B in the image reader 220) through the communication line 290, and a character recognition result may be obtained.

FIG. 3 and FIG. 4 are flowcharts illustrating process examples of the present exemplary embodiment.

In Step S302, the image receiving module 110 receives an image A.

In Step S304, the image receiving module 110 receives an image B.

In Step S306, the image splitting module 120 splits the image A to generate the split image A.

In Step S308, the image splitting module 120 splits the image B to generate the split image B. The split image B is smaller than the split image A.

In Step S310, the correlation coefficient calculating module 140 calculates the correlation coefficient between the split image A and the split image B.

In Step S312, the correlation coefficient calculating module 140 moves the split image B in the split image A.

In Step S314, the correlation coefficient calculating module 140 determines whether or not scanning is ended and proceeds to Step S316 in a case where scanning is ended and otherwise returns to Step S310.

In Step S316, the excluding module 150 extracts a peak A of the correlation coefficient.

In Step S318, the excluding module 150 changes the inside of a partial region including the peak A to a lower value (for example, the lowest value) of the correlation coefficient in the distribution of the correlation coefficient.

In Step S320, the excluding module 150 extracts a peak B of the correlation coefficient in the distribution of the correlation coefficient after the process of Step S318.

In Step S322, the excluding module 150 determines whether or not "the difference between the peak A and the peak B<a threshold T" is true and proceeds to Step S324 in a case where "the difference between the peak A and the peak B<the threshold T" is true and otherwise proceeds to Step S326.

In Step S324, the excluding module 150 excludes the correlation coefficient in the split images.

In Step S326, the shift calculating module 160 calculates the amount of shift in the split images.

In Step S328, the correlation coefficient calculating module 140 determines whether or not there are split images from which the correlation coefficient is not calculated and returns to Step S310 in a case where there are such split images and otherwise proceeds to Step S330.

In Step S330, the image correcting module 170 corrects the image B to be aligned to the image A.

In Step S332, the image correcting module 170 outputs the image B after correction.

A hardware configuration example of the image processing apparatus of the present exemplary embodiment will be described with reference to FIG. 17. The configuration illustrated in FIG. 17 is configured of, for example, a personal computer (PC). The hardware configuration example illustrated in FIG. 17 includes a data reading section 1717 such as a scanner and a data output section 1718 such as a printer.

A central processing unit (CPU) 1701 is a controller that performs processes in accordance with a computer program in which execution sequences of various modules described in the above exemplary embodiment, that is, each module of the image receiving module 110, the image splitting module 120, the template matching process module 130, the correlation coefficient calculating module 140, the excluding module 150, the shift calculating module 160, the image correcting module 170, and the like, are described.

A read-only memory (ROM) 1702 stores programs, operation parameters, and the like used by the CPU 1701. A random access memory (RAM) 1703 stores programs used in execution by the CPU 1701, parameters that are appropriately changed during the execution, and the like. The ROM 1702 and the RAM 1703 are connected to each other by a host bus 1704 that is configured of a CPU bus and the like.

The host bus 1704 is connected to an external bus 1706 such as a peripheral component interconnect/interface (PCI) bus and the like through a bridge 1705.

A keyboard 1708 and a pointing device 1709 such as a mouse are devices operated by the operator. A display 1710 is a liquid crystal display device, a cathode ray tube (CRT), or the like and displays various types of information as text or image information. A touch screen or the like that includes the functions of both of the pointing device 1709 and the display 1710 may be used as well.

A hard disk drive (HDD) 1711 incorporates a hard disk (may be a flash memory and the like as well), drives the hard disk, and records or reproduces information and programs executed by the CPU 1701.

The hard disk stores images received by the image receiving module 110, correlation coefficients calculated, process results of the image correcting module 170, and the like. Furthermore, the hard disk stores other various types of data, various computer programs, and the like.

A drive 1712 reads data or programs recorded in a removable recording medium 1713 such as a magnetic disk, an optical disc, a magnetooptical disc, a semiconductor memory, or the like mounted and supplies the data or programs to the RAM 1703 that is connected thereto through an interface 1707, the external bus 1706, the bridge 1705, and the host bus 1704. The removable recording medium 1713 may be used as a data recording region.

A connection port 1714 is a port to which an externally connected machine 1715 is connected, and includes a connection section such as USB, IEEE1394, and the like. The connection port 1714 is connected to the CPU 1701 and the like through the interface 1707, the external bus 1706, the bridge 1705, the host bus 1704, and the like. A communicating section 1716 is connected to a communication line and performs an external data communication process. The data reading section 1717 is, for example, a scanner and performs a document reading process. The data output section 1718 is, for example, a printer and performs a document data output process.

The hardware configuration of the image processing apparatus illustrated in FIG. 17 is one configuration example. The present exemplary embodiment is not limited to the configuration illustrated in FIG. 17 and may have any configuration provided that the modules described in the present exemplary embodiment can be executed. For example, a part of the modules may be configured of dedicated hardware (for example, an application-specific integrated circuit (ASIC) and the like). A part of the modules may be in an external system and may be connected to a communication line. Furthermore, multiple numbers of the systems illustrated in FIG. 17 may be connected to each other by a communication line and may cooperate with each other. Particularly, the image processing apparatus may be incorporated in a mobile information communicating machine (includes a mobile telephone, a smart phone, a mobile machine, a wearable computer, and the like), an information appliance, a robot, a photocopier, a facsimile, a scanner, a printer, a multifunction machine, and the like in addition to a personal computer.

The program described may be provided as being stored in a recording medium. The program may be provided by a communication unit. In that case, for example, the described program may be perceived as an invention of "a computer readable recording medium in which the program is recorded".

The "computer readable recording medium in which the program is recorded" refers to a computer readable recording medium in which the program is recorded and that is used for installation and execution of the program, distribution of the program, and the like.

Examples of the recording medium include, for example, "DVD-R, DVD-RW, DVD-RAM, and the like" that are digital versatile discs (DVD) and are standards established by the DVD Forum; "DVD+R, DVD+RW, and the like" that are standards established by the DVD+RW Alliance; a read-only memory (CD-ROM), a CD-recordable (CD-R), a CD-rewritable (CD-RW), and the like that are compact discs (CD); a BLU-RAY (registered trademark) disc; a magnetooptical disc (MO); a flexible disk (FD); a magnetic tape; a hard disk; a read-only memory (ROM); an electrically erasable and rewritable read-only memory (EEPROM (registered trademark)); a flash memory; a random access memory (RAM); and a secure digital (SD) memory card.

A part or the entirety of the program may be, for example, retained or distributed by being recorded in the recording medium. The program may be transferred by using a transfer medium such as a wired network used in, for example, a local area network (LAN), a metropolitan area network (MAN), a wide area network (WAN), the Internet, an intranet, and an extranet; a wireless communication network; or a combination thereof or may be carried by being superimposed on a carrier wave.

Furthermore, the program may be a part or the entirety of another program or may be recorded in the recording medium along with a different program. The program may be recorded in a split manner in multiple recording media. The program may be recorded in any form such as compression and encryption provided that the program is restorable.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a splitting unit that splits each of two images into a plurality of regions;
   an extracting unit that extracts a first value indicating the highest similarity in an array, in the array values indicating similarity between corresponding split images between the two images are arranged, and that extracts a second value indicating highest similarity after excluding similarity in an area including a position of the first value from targets; and
   a controlling unit that controls to perform position alignment of the two images by excluding a value, of the values indicating the similarity of each of the split images, indicating similarity, a difference between the first value and the second value is less than or equal to a predetermined threshold in the similarity.

2. The image processing apparatus according to claim 1, wherein
   the splitting unit sets a first split image in one image to be smaller than a second split image in the other image, and
   the array of the values indicating the similarity is an array that results from calculating values indicating the similarity by shifting the first split image in the second split image.

3. An image processing method comprising:
   splitting each of two images into a plurality of regions;
   extracting a first value indicating the highest similarity in an array, in the array values indicating similarity between corresponding split images between the two images are arranged, and extracting a second value indicating highest similarity after excluding similarity in an area including a position of the first value from targets; and
   performing position alignment of the two images by excluding a value, of the values indicating the similarity of each of the split images, indicating similarity, a difference between the first value and the second value is less than or equal to a predetermined threshold in the similarity.

4. A non-transitory computer readable medium storing an image processing program that causes a computer to execute a process comprising:
   splitting each of two images into a plurality of regions;
   extracting a first value indicating the highest similarity in an array, in the array values indicating similarity between corresponding split images between the two images are arranged, and extracting a second value indicating highest similarity after excluding similarity in an area including a position of the first value from targets; and performing position alignment of the two images by excluding a value, of the values indicating the similarity of each of the split images, indicating similarity, a difference between the first value and the second value is less than or equal to a predetermined threshold in the similarity.

* * * * *